United States Patent
Yoshida

(10) Patent No.: US 11,322,970 B2
(45) Date of Patent: May 3, 2022

(54) DEVICE WITH POWER-OFF CHARGING CAPABILITY

(71) Applicant: CANON KABUSHIKI KAISHA, Tokyo (JP)

(72) Inventor: Masashi Yoshida, Miura-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 343 days.

(21) Appl. No.: 15/715,410

(22) Filed: Sep. 26, 2017

(65) Prior Publication Data

US 2018/0097395 A1 Apr. 5, 2018

(30) Foreign Application Priority Data

Sep. 30, 2016 (JP) .............................. JP2016-194770

(51) Int. Cl.
*H02J 7/00* (2006.01)
*H02J 7/04* (2006.01)

(52) U.S. Cl.
CPC .................. *H02J 7/04* (2013.01); *H02J 7/00* (2013.01); *H02J 7/00036* (2020.01)

(58) Field of Classification Search
CPC .......... H02J 7/04; H02J 7/0004; H02J 7/0052; H02J 7/0062; H02J 7/0003; H02J 7/00032; H02J 7/00034; H02J 7/00036; H02J 7/00038; H02J 7/00041; H02J 7/00043; H02J 7/00045
USPC ...................................................... 320/107
See application file for complete search history.

(56) References Cited

U.S. PATENT DOCUMENTS

| | | | | |
|---|---|---|---|---|
| 2004/0078716 A1* | 4/2004 | Schulze | ................. | G06F 11/267 714/43 |
| 2007/0087765 A1* | 4/2007 | Richardson | ............. | H04W 4/14 455/466 |
| 2012/0104867 A1* | 5/2012 | Mudrick | ................. | H02J 7/025 307/104 |
| 2012/0151231 A1* | 6/2012 | Hatta | ...................... | G06F 1/266 713/320 |
| 2012/0242282 A1* | 9/2012 | Wada | ...................... | G06F 1/266 320/107 |
| 2013/0175992 A1* | 7/2013 | Tinaphong | .......... | H02J 7/00047 320/111 |
| 2014/0111142 A1* | 4/2014 | Lee | ....................... | G06F 1/3206 320/107 |

(Continued)

FOREIGN PATENT DOCUMENTS

JP 2012-123673 A 6/2012
JP 2014-123673 A 7/2014

*Primary Examiner* — Richard Isla
*Assistant Examiner* — Michael N Dibenedetto
(74) *Attorney, Agent, or Firm* — Cowan, Liebowitz & Latman, P.C.

(57) ABSTRACT

An electronic device includes a charging unit, a maintaining unit, and a control unit. The charging unit charges a battery device with power supplied from a power supply line of an external cable. The maintaining unit maintains a connected state to a predetermined voltage of a specific line of the external cable by using power supplied from the power supply line. The control unit controls the maintaining unit so that the connected state is maintained by the maintaining unit, in a case where the charging unit is charging the battery device with power supplied from the power supply line when the electronic device is set to a power-off state.

11 Claims, 12 Drawing Sheets

(56) References Cited

U.S. PATENT DOCUMENTS

2014/0174351 A1   6/2014   Aikawa
2015/0244187 A1*  8/2015   Horie .................... H02J 7/0073
                                                      320/112

* cited by examiner

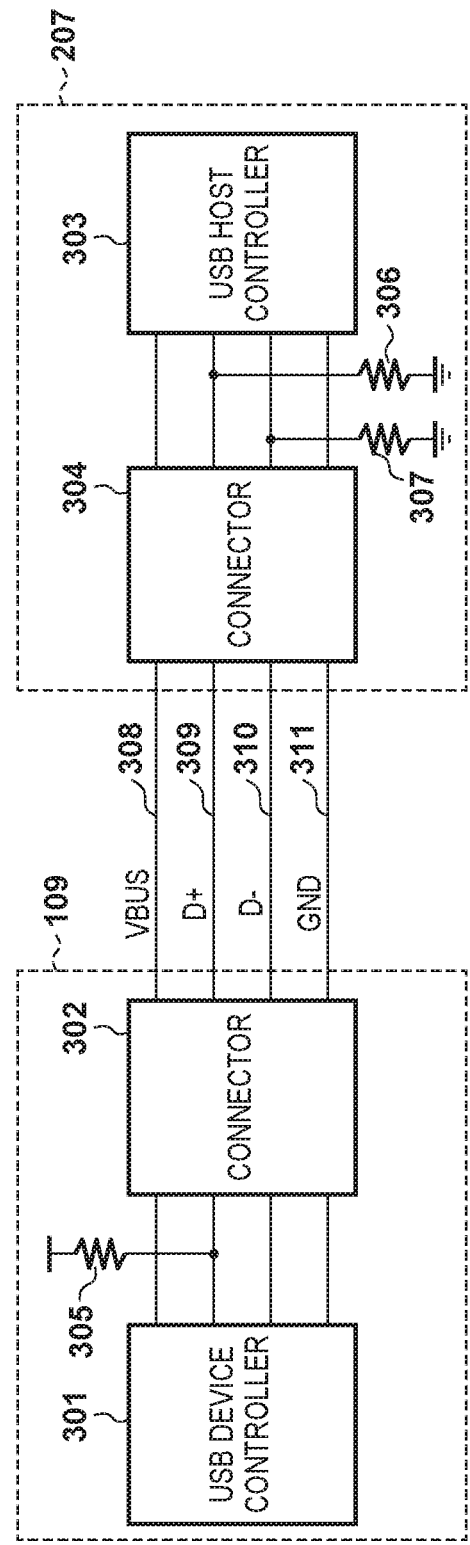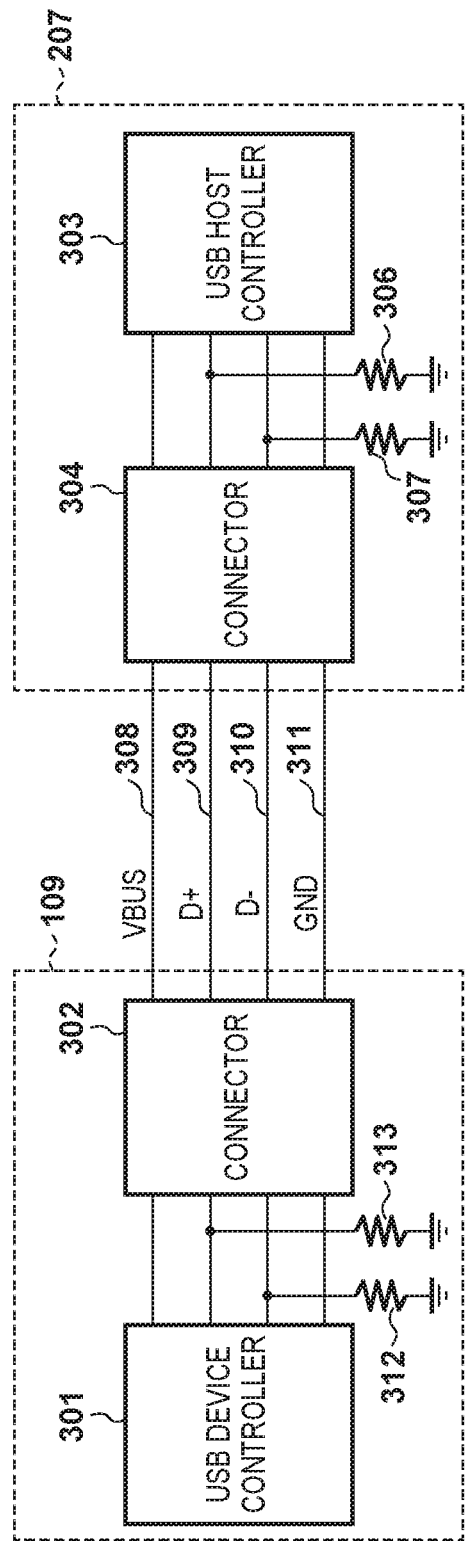

DEVICE WITH POWER-OFF CHARGING CAPABILITY

BACKGROUND

Field of the Invention

Aspects of the present inventions generally relate to an electronic device capable of charging a battery device.

Description of the Related Art

In general, an electronic device such as a digital camera includes, as the interface for an external apparatus, an interface complying with USB (Universal Serial Bus) standards. Other than performing data communication with the external apparatus, a USB device can receive power supply from the external apparatus and use the supplied power to operate the device or charge (perform USB charging of) a battery in the device. The external apparatus, from which the electronic device functioning as the USB device receives power supplied via the USB, can be a USB host such as a charging-dedicated AC adapter or a PC (personal computer) that can simultaneously perform data communication and USB charging.

In Japanese Patent Laid-Open No. 2012-123673, there is proposed a technique in which a computer apparatus serving as the USB host switches, while maintaining a state in which a USB device is connected to the computer apparatus, between a power-supply state and a power-shutdown state with respect to the connected USB device.

When a USB device is connected to a USB host such as a personal computer (to be referred to as a PC hereinafter), the USB device can simultaneously perform data communication and USB charging. Hence, the USB device will perform USB charging while maintaining a state of communication with the USB host. That is, USB charging will be performed in a state in which the USB device remains in a power-on state.

A user who wants to charge a USB device may think that the charging time can be shortened by performing charging by setting the USB device to a power-off state instead of keeping the USB device in the power-on state. However, if the USB device is set to the power-off state, the pull-up state or the pull-down state of a predetermined signal line (for example, a D+ or D− line) will be canceled in the USB device. On the other hand, when the USB host detects that the pull-up state or the pull-down state of the predetermined signal has been canceled, the USB host will determine that the USB has been disconnected. Upon detecting the disconnection of the USB, the USB host will shut down the power supplied to the USB device. In this manner, since setting the USB device to the power-off state during USB charging corresponds to a state in which the USB connection between the USB device and the USB host has been disconnected, the USB host will stop supplying power, and the USB device will not be able to continue the USB charging operation.

SUMMARY

According to an aspect of the present invention, at least one of the above-described drawbacks and disadvantages can be overcome.

According to an aspect of the present invention, it is possible to improve an electronic device that charges a battery device by using power supplied from an external apparatus.

According to an aspect of the present invention, there is provided an electronic device comprising: a charging unit that charges a battery device with power supplied from a power supply line of an external cable; a maintaining unit that maintains a connected state to a predetermined voltage of a specific line of the external cable by using power supplied from the power supply line; and a control unit that controls the maintaining unit so that the connected state is maintained by the maintaining unit, in a case where the charging unit is charging the battery device with power supplied from the power supply line when the electronic device is set to a power-off state.

Further features and aspects of the present invention will become apparent from the following description of exemplary embodiments.

BRIEF DESCRIPTION OF THE DRAWINGS

FIG. 3A is a block diagram illustrating an arrangement when a connection is established by USB 1.1 (FS);

FIG. 3B is a block diagram illustrating an arrangement when a connection is established by USB 2.0 (HS);

DESCRIPTION OF THE EMBODIMENTS

Exemplary embodiments, features, and aspects of the present invention will be described below with reference to the drawings. However, aspects of the present invention are not limited to the following exemplary embodiments.

First Embodiment

Figure 1:
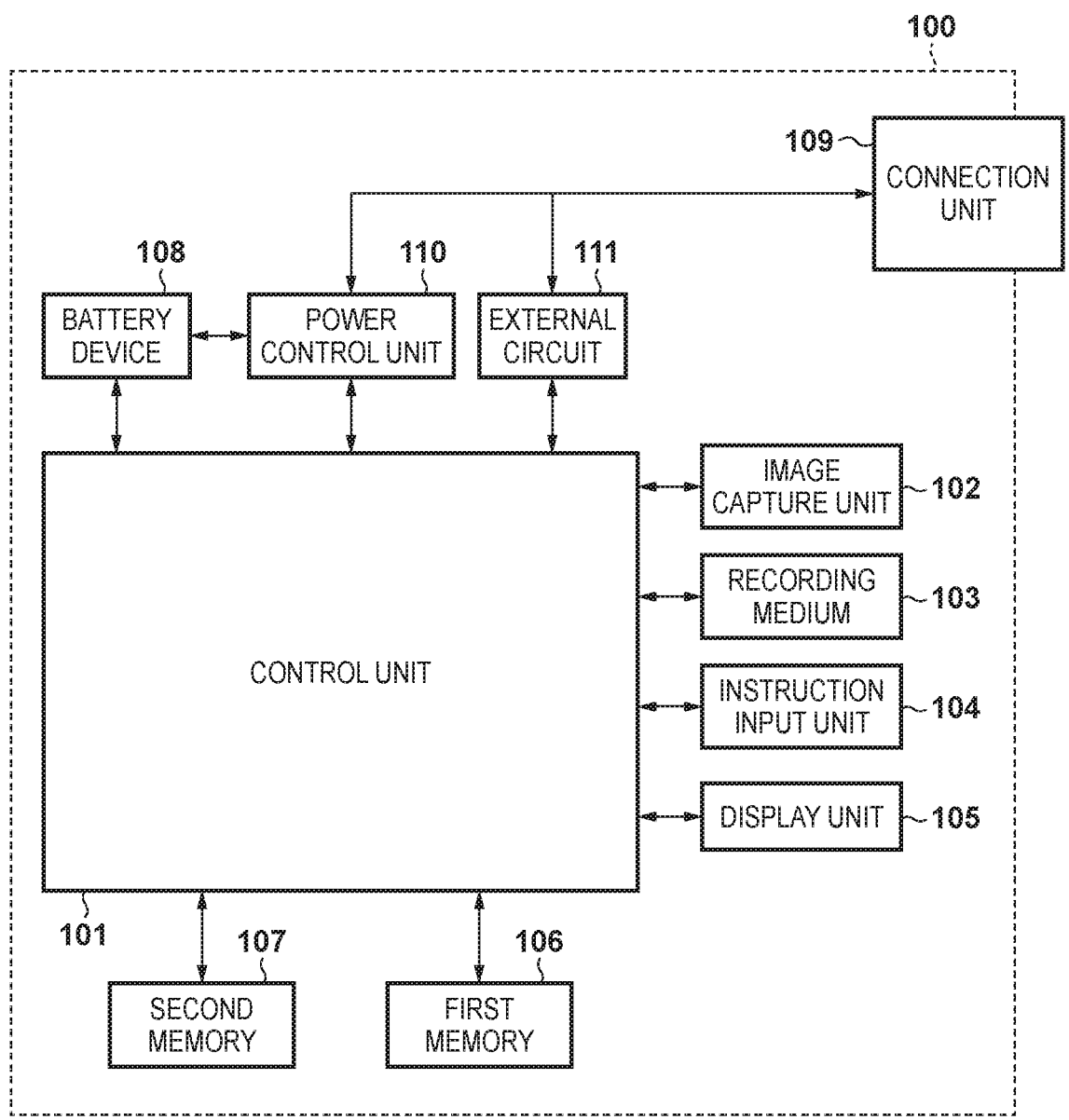
FIG. 1 is a block diagram illustrating an example of the arrangement of an electronic device 100 in the first to fourth embodiments.

FIG. 1 is a block diagram illustrating an example of the arrangement of an electronic device 100 in the first embodiment. The first embodiment exemplifies an arrangement using a USB (Universal Serial Bus) as an example of an external cable. Note that although the first embodiment will illustrate a case in which the electronic device 100 is a device that operates as a digital camera, the electronic device 100 is not limited to a device that operates as a digital camera. The electronic device 100 can be any kind of device that can communicate with a USB host. For example, the electronic device 100 can be a device that operates as a portable phone or a personal computer.

A control unit 101 controls each component of the electronic device 100 in accordance with input signals and programs (for example, programs stored in a second memory 107) (to be described later). Note that instead. of the control unit 101 controlling the overall electronic device 100, the overall electronic device 100 may be controlled by causing a plurality of pieces of hardware to share processes. An image capture unit 102 converts an object image formed by a lens into electrical signals and outputs, as image data, digital data obtained by performing a noise reduction process and the like on the converted electrical signals. After the output image data is accumulated in a buffer memory (for example, a first memory 106), it undergoes a predetermined computation by the control unit 101 and is stored in a recording medium 103. The recording medium 103 can store image data output from the image capture unit 102. The recording medium 103 may be detachable from the electronic device 100 or may be incorporated in the electronic device 100. That is, it is sufficient for the electronic device 100 to include a means for accessing at least the recording medium 103.

An instruction input unit 104 is used to accept an instruction to the electronic device 100 from a user. The instruction input unit 104 includes a power button used by the user to make an instruction to set the electronic device 100 to a power-on state or a power-off state, a release switch to instruct shooting, and a zoom lever to instruct a zoom magnification. The instruction input unit 104 further includes a playback button to instruct playback of image data and a mode dial to instruct the activation mode of the electronic device 100. Also, a touch panel formed on a display unit 105 (to be described later) is also included in the instruction input unit 104. Note that the release switch includes SWI and SW2. When the release switch is in a so-called half-stroke state, SW1 is set to on. This starts an operation for shooting standby such as an AF (Auto Focus) process, an AE (Auto Exposure) process, an AWB (Auto White Balance) process, and an EF (Electronic pre-Flash) process. When the release switch is in a so-called full-stroke state, SW2 is set to on. This starts the shooting operation.

The display unit 105 displays a viewfinder image upon shooting, shot image data, and characters for an interactive instruction. Note that the display unit 105 need not always be incorporated in the electronic device 100. It is sufficient for the electronic device 100 to be capable of connecting to an internal or an external display unit 105 and to have at least a display control function to control the display of the display unit 105. The first memory 106 is used as a buffer memory that temporarily stores image data captured by the image capture unit 102, as an image display memory of the display unit. 105, and as a work area of the control unit 101. The second memory 107 stores programs (to be described later) to be executed by the control unit 101.

A battery device 108 supplies power necessary to operate the electronic device 100. The battery device 108 may be detachable from the electronic device 100 or may be incorporated in the electronic device 100. The battery device 108 is formed so that it can be charged by the external power received from a connection unit 109 via a power control unit 110.

The connection unit 109 is an interface to connect the electronic device to another device (for example, an external apparatus 200) and is a USB interface in the first embodiment. The electronic device 100 can exchange data with the other device via the connection unit. 109. The electronic device 100 can also receive an external power supply from the other device via the connection unit 109. Note that the electronic device 100 is a device that functions as a USB device, and the connection unit 109 includes an interface connector and a USB device controller (to be described later) to perform communication complying with the USB standard with the other device. The control unit 101 implements USB communication and USB charging with the other device by controlling the connection unit 109.

The power control unit 110 supplies the external power received from the connection unit 109 to the overall electronic device 100 via the control unit 101. The power control unit 110 also charges the battery device 108 by using power (external power), received via the connection unit 109, supplied from a power supply line of the external cable. An external circuit 111 is a circuit that maintains, even after the electronic device 100 has been set to the power-off state, a connected state in which a specific line of the external cable is connected to a predetermined voltage in the same manner as while the electronic device 100 is communicatively connected to the external apparatus 200 via the external cable. In the first embodiment, a USB is used as the external cable, and the external circuit 111 attaches/detaches a pull-up resistance or a pull-down resistance to/from a USB signal line (D+ line or D− line) connected to the connection unit 109. The connected. state in which a lead wire is connected to the predetermined voltage can be enabled or disabled by attaching or detaching the pull-up resistance or the pull-down resistance in this manner. Note that the connected state can be enabled or disabled by the control unit 101. More specific details will be described later.

Figure 2:
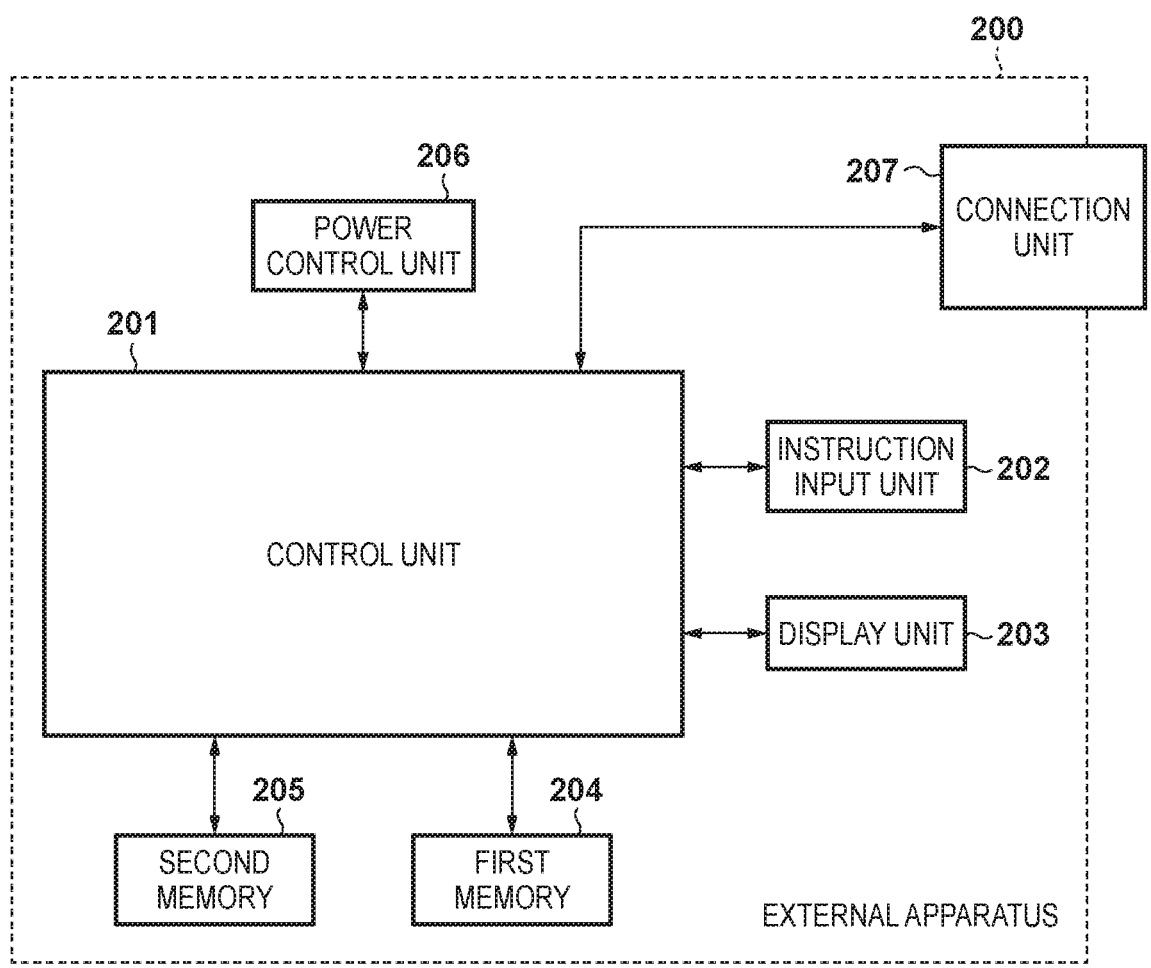
FIG. 2 is a block diagram illustrating an example of the arrangement of an external apparatus 200 in the first to fourth embodiments.

FIG. 2 is a block diagram illustrating a plurality of components included in the external apparatus 200 which can connect to the electronic device 100 in the first embodiment. Note that although the first embodiment will illustrate a case in which the external apparatus 200 is a device that operates as a PC (personal computer), the external apparatus 200 is not limited to a device that operates as a PC. The external apparatus 200 may be any kind of device that is capable of functioning as a USB host. For example, the external apparatus 200 may be a device that operates as a printer or a USB hub.

A control unit 201 controls each component of the external apparatus 200 in accordance with input signals and programs (to be described later). Note that instead of the control unit 201 controlling the overall external apparatus 200, the overall external apparatus 200 may be controlled by causing a plurality of pieces of hardware to share processes. An instruction input unit 202 is used to receive an instruction to the external apparatus 200 from the user. The instruction input unit 202 includes, for example, a mouse and a keyboard. A touch panel formed on a display unit 203 is also included in the instruction input unit 202.

The display unit 203 is a display device such as a liquid crystal display device. The display unit 203 need not always be incorporated in the external apparatus 200. It is sufficient for the external apparatus 200 to be able to connect to the internal or external display unit 203 and to have at least a display control function that controls the display of the display unit 203. A first memory 204 is used as an image display memory of the display unit 203 and is used as a work area of the control unit 201. A second memory 205 stores programs to be executed by the control unit 201.

A power control unit 206 controls a power supply necessary to operate the external apparatus 200. The power control unit 206 can have, for example, an arrangement to control power supplied by a battery formed to be incorporated in the external apparatus 200 or an arrangement to control power received from outside. That is, it is sufficient for the power control unit 206 to have a means capable of supplying power at least to the components of the external apparatus 200.

A connection unit 207 is an interface to connect the external apparatus 200 to another device. In the first embodiment, the external apparatus 200 can exchange data with the other device (the electronic device 100 in the first embodiment) via the connection unit 207. Note that the external apparatus 200 is an apparatus that functions as a USB host in the first embodiment, and the connection unit 207 includes an interface connector and a USB host controller for performing communication complying with the USB standard with the other device. The control unit 201 implements USB communication between the external apparatus 200 and the other device by controlling the connection unit 207.

FIGS. 3A and 3B are block diagrams showing the arrangements of the USB connection in the first embodiment, and show the details and the connection forms of the connection unit 109 and the connection unit 207. FIG. 3A is a view showing the arrangement when the electronic device 100 and the external apparatus 200 are connected by an FS (Full Speed) mode of USB 1.1 or USB 2.0. FIG. 3B is a view showing the arrangement when the electronic device 100 and the external apparatus 200 are connected by an HS (High Speed) mode of USB 2.0. Note that the USB connection by the FS mode will be called a connection by USB 1.1, and the USB connection by the HS mode will be called a connection by USB 2.0 hereinafter. Also, the USB connection is an example of the external cable in which a specific line (D+ line or the D− line) is connected to a predetermined voltage (VBUS) when the electronic device and the external apparatus are communicatively connected by a specific communication mode (for example, the FS mode or the HS mode), and another connection method may also be used.

As shown in FIGS. 3A and 3B, the connection unit 109 includes a USB device controller 301, a USB interface connector 302, and internal resistances 305, 312, and 313. The connection unit 207 includes a USB host controller 303, an interface connector 304, and internal resistances 306 and 307.

The USB device controller 301 is a controller that controls the USB communication on the side of the USB device and controls the states of a D+ line 309 and a D− line 310 in accordance with the data to be transmitted. The USB device controller 301 also outputs each signal obtained from the D+ line 309 and the D− line 310 as a digital signal SIG corresponding to the level handled by the control unit 101. The USB interface connector 302 is a USB cable insertion port of the electronic device 100, and the user inserts/removes the USB cable to/from the USB interface connector 302. The internal resistance 305 is a resistance to pull up the D+ line 309 (to be described later), and the execution of the pull-up is controlled by the USB device controller 301. The internal resistance 312 is a resistance to pull down the D− line 310 (to be described later), and the execution of the pull-down is controlled by the USB device controller 301. The internal resistance 313 is a resistance to pull down the D+ line 309 (to be described later), and the execution of the pull-down is controlled by the USB device controller 301.

In the connection unit 207, the interface connector 304 is an USB cable insertion port in the external apparatus 200, and the user can insert/remove the USB cable to/from the interface connector 304. The internal resistances 306 and 307 are resistances to pull down the D+ line 309 and the D− line 310 (to be described later), and their respective connections are controlled by the USB host controller 303.

The connection unit 109 and the connection unit 207 are connected to each other by the 4 lead wires 308 to 311. The VBUS 308 is a lead wire used to supply power from the external apparatus 200 to the electronic device 100. The D+ line 309 and the D− line 310 are lead wires used when performing data communication. The GND 311 is a ground lead wire.

A case in which the USB interfaces are connected. by USB 1.1 (FS mode) will be illustrated first with reference to FIG. 3A. When the electronic device 100 and the external apparatus 200 are connected to each other by the USB cable, power from the external apparatus 200 is supplied via the VBUS 308. The USB device controller 301 detects that a USB host such as the external apparatus 200 has been connected to the electronic device by detecting that the voltage level of the VBUS 308 has changed to High. Accordingly, the USB device controller 301 controls the connection of the internal resistance 305 and pulls up the D+ line 309. The USB host controller 303 detects that an FS mode connection has been established with a USB device such as the electronic device 100 by detecting that the voltage level of D+ line 309 has changed to High. The electronic device 100 and the external apparatus 200 become connected to each other by the FS mode of USB 1.1 (or USB 2.0) in the above-described manner.

Subsequently, whether the electronic device 100 and the external apparatus 200 both are complying with USB 2.0 is determined based on the changes in the voltage levels of the respective D+ line 309 and. the D− line 310. FIG. 35 shows a state in which the USB interfaces are connected by the HS mode of USB 2.0. If is determined that both devices are in compliance with USB 2.0, the USB device controller 301 disables the internal resistance 305 and cancels the pull-up of the D+ line 309. Then, the USB device controller 301 enables the internal resistances 312 and 313 to change the voltage level by pulling down the D+ line 309 and the D− line 310 to ground level. This causes the electronic device 100 and the external apparatus 200 to be connected to each other by USB 2.0.

Disconnection detection is the opposite of this process. The USB device controller 301 detects that the connection to the USB host such as the external apparatus 200 has been disconnected by detecting that the voltage level of the VBUS 308 has changed to Low. The USB host controller 303 detects that the connection to the USB device such as the electronic device 100 has been disconnected by detecting that the voltage level of the D+ line 309 has changed from the state of FIG. 3A or FIG. 3B.

Figure 4A:
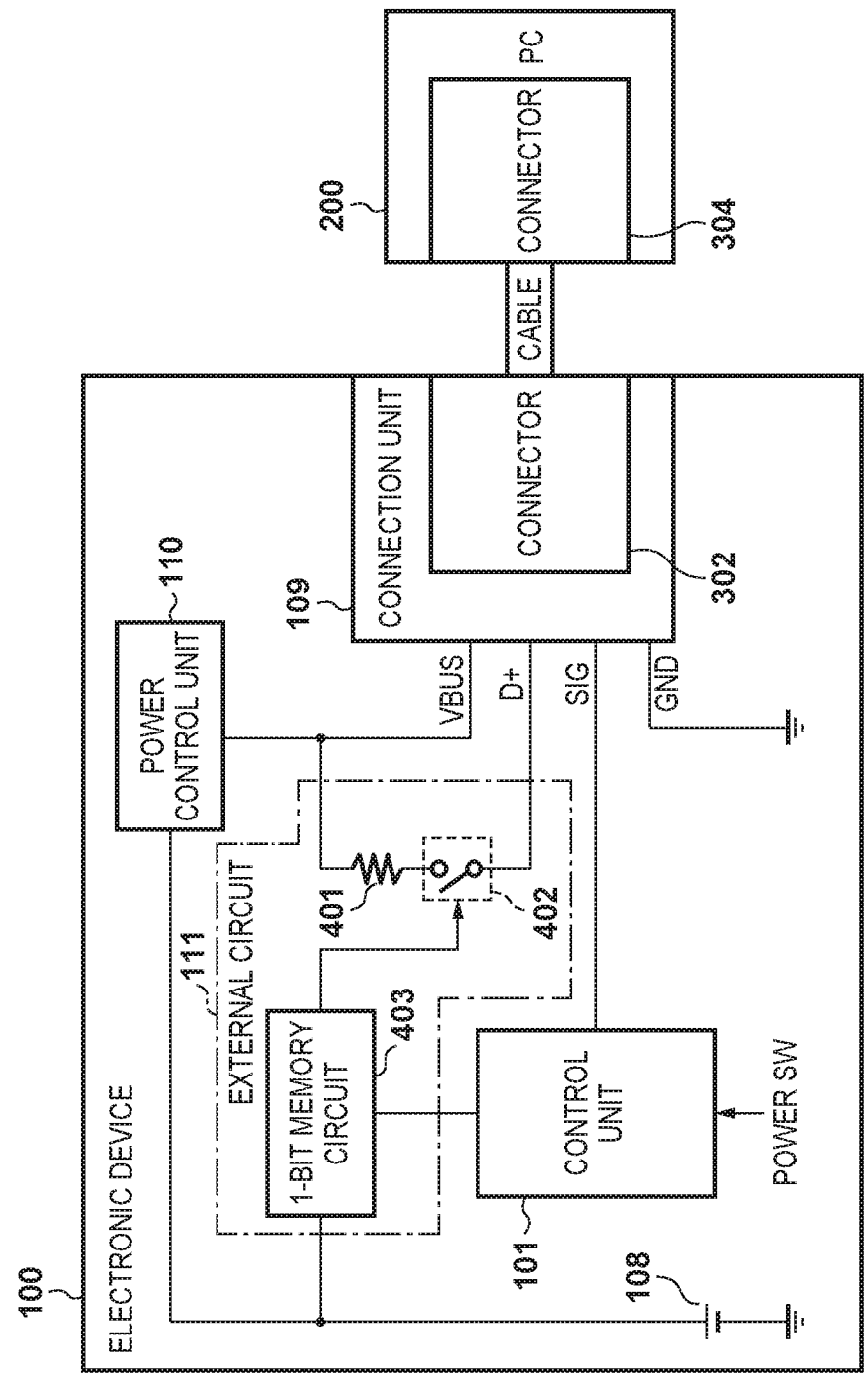
FIGS. 4A and 4B are block diagrams respectively showing examples of USB connections in the first and second embodiments.
Figure 4B:
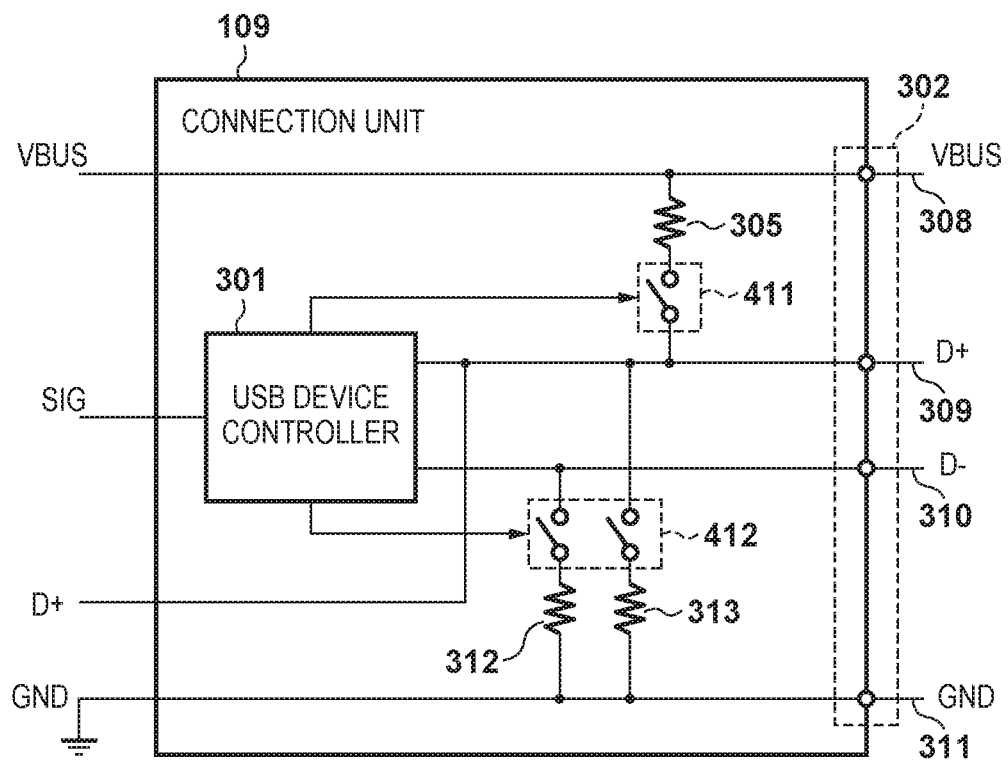

FIG. 4A is a block diagram showing the details of the connection unit 109 and the external circuit 111 of the electronic device 100, and FIG. 4B is a block diagram showing a more detailed arrangement of the connection unit 109 of the electronc device 100. As shown in FIG. 4B, the USB device controller 301 controls the pull-up connection to the VBUS 308 of the D+ line 309 by the internal resistance 305 by controlling the on-state/off-state of a switch circuit 411. The USB device controller 301 also controls the pull-down connection to the GND 311 of the D− line 310 and the D+ line 309 by the internal resistances 312 and 313 by controlling the on-state/off-state of a switch circuit 412. When the electronic device 100 is changed to the power-off state, the USB device controller 301 is also changed to a power-off state. Hence, the pull-up state and the pull-down state by the switch circuits 411 and 412 are not maintained, thereby changing the D+ line 309 and the D− line 310 into a floating state. As a result, the external apparatus 200 (USB host) detects the disconnection of the USB and stops supplying power to the VBUS. In the first embodiment, while the electronic device 100 is in the power-off state, the USB connection with the external apparatus 200 is maintained by the external circuit 111 so that the power supply (charging) to the VBUS is continued.

As shown in FIG. 4A, the external circuit 111 includes a pull-up resistance 401, a switch circuit 402, and a 1-bit memory circuit 403. The external circuit 111 operates by receiving power from the VBUS 308 or the battery device 108. Hence, the 1-bit memory circuit 403 maintains a bit state after the electronic device 100 has been set to the power-off state. The switch circuit 402 is set to the on-state or the off-state in accordance with the bit state of the 1-bit memory circuit 403. The pull-up resistance 401 has the same resistance value as the internal resistance 305, and its one end is connected to the VBUS 308 and the other end is connected to the switch circuit 402. Therefore, the pull-up of the D+ line 309 is determined in accordance with the state or the switch circuit 402. By causing the 1-bit memory circuit 403 to maintain the bit state, the pull-up state to the VBUS of the D+ line by the switch circuit 402 is maintained.

Figure 5:
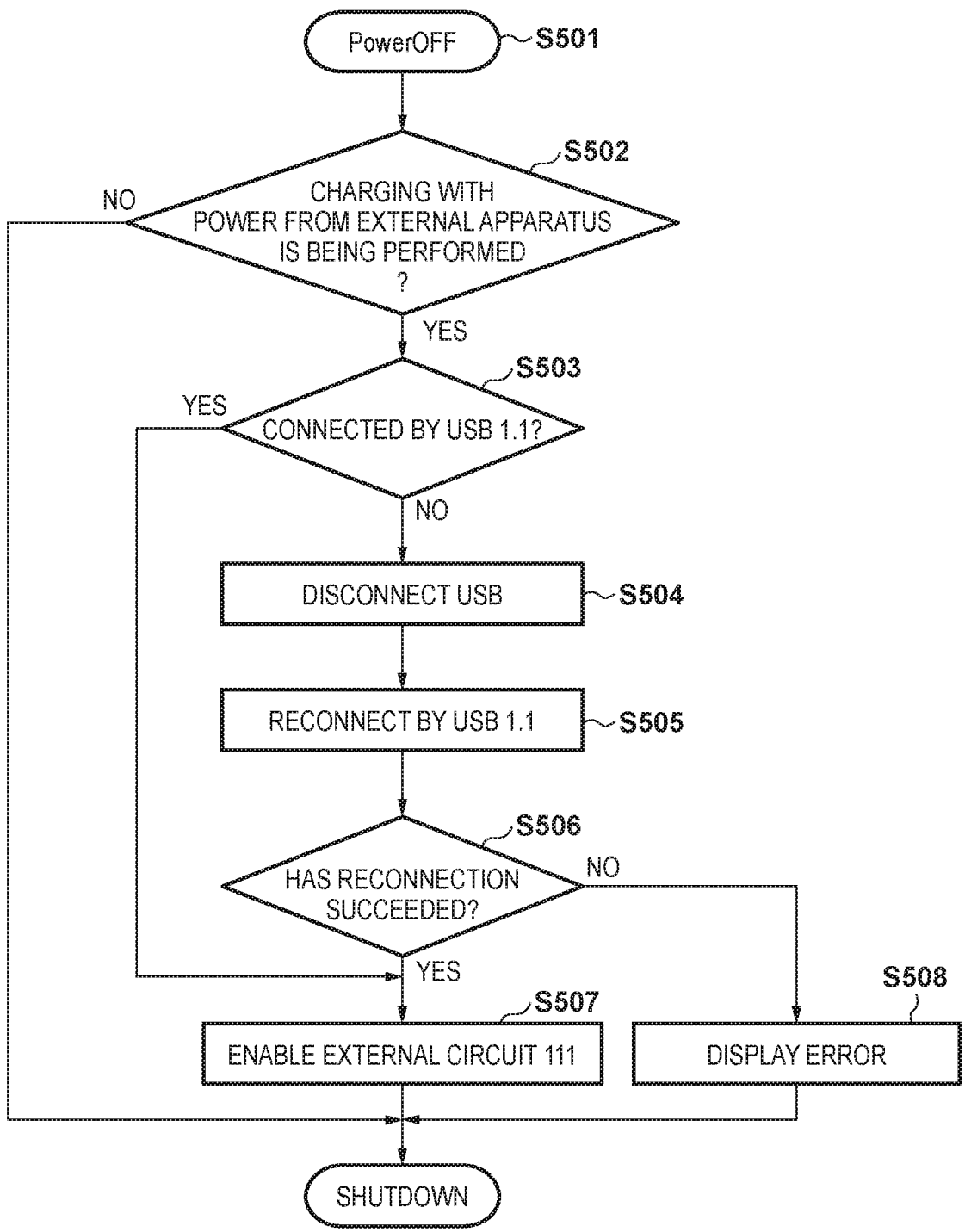
FIG. 5 is a flowchart illustrating an exemplary process of the electronic device 100 in the first embodiment.

FIG. 5 is a flowchart illustrating an exemplary process (including power-off sequence) of the electronic device 100 that is performed when the electronic device 100 is set to the power-off state after the USB connection with the external apparatus 200 has been established. Note that the exemplary process shown in this flowchart is implemented by the control unit 101 controlling the components of the electronic device 100 in accordance with input signals and programs. Note that, unless otherwise specified, the same applies to other flowcharts showing the exemplary process of the electronic device 100. The exemplary process (including power-off sequence) shown in FIG. 5 is started, for example, in response to a predetermined user instruction to the electronic device 100 (for example, a power-off instruction made by user operation of the power button of the instruction input unit 104).

In step S501, the control unit 101 starts the exemplary process to set the electronic device 100 to the power-off state, and advances the exemplary process to step S502.

In step S502, the control unit 101 determines whether USB charging with power supplied from the external apparatus 200 is being performed. In step S502, if it is determined that the USB charging with power supplied from the external apparatus 200 is being performed, the control unit 101 advances the exemplary process to step S503 to determine whether the electronic device is connected to the external apparatus 200 by USB 1.1 (FS mode). In step S502, if it is determined that the USB charging with power supplied from the external apparatus 200 is not being performed, the control unit 101 sets the electronic device 100 to the power-off state.

In step S503, if it is determined that the electronic device is connected to the external apparatus 200 by USB 1.1, the control unit 101 advances the exemplary process to step S507. In step S503, if it is not determined that the electronc device is not connected to the external apparatus 200 by USB 1.1, the control unit 101 advances the exemplary process to step S504.

In step S504, the control unit 101 performs a USB disconnection process. For example, if the electronic device and the external apparatus are currently connected by USB 2.0 (HS mode), the control unit 101 controls the USB device controller 301 in the connection unit 109 and sets the switch circuit 412 to the off-state by the USB device controller 301. This disables the pull-down by the internal resistances 312 and 313. As a result, the external apparatus 200 detects that the USB connection has been disconnected. Subsequently, the control unit 101 advances the exemplary process to step S505.

In step S505, the control unit 101 reconnects the electronic device 100 to the external apparatus 200 by USB 1.1. That is, the control unit 101 enables the pull-up by the internal resistance 305 by controlling the USB device controller in the connection unit 109 and setting the switch circuit 411 to the on-state by the USB device controller 301. The USB device controller 301 operates to maintain the USB 1.1 connection without establishing the connection by USB 2.0 even if the external apparatus 200 is complying with USB 2.0 in accordance with the instruction of the control unit 101. Subsequently, the control unit 101 advances the exemplary process to step S506 and determines whether the reconnection by USB 1.1 has succeeded.

In step S506, if it is determined that the reconnection by USB 1.1 to the external apparatus 200 has succeeded, the control unit 101 advances the exemplary process to step S507. In step S506, if it is determined that the reconnection by USB 1.1 to the external apparatus 200 has failed, the control unit 101 advances the exemplary process to step S508.

In step S507, the control unit 101 enables the external circuit 111. The external circuit 111 is a circuit that is equivalent to the internal resistance 305 in the connection unit 109 and is a circuit that can maintain the pull-up of the D+ ine 309 even after the power of the electronic device 100 has been turned off. For example, as shown in FIG. 4A, the control unit 101 sets the bit state of the 1-bit memory circuit 403 of the external circuit 111 to "1 (on)". When the bit-state of the 1-bit memory circuit 403 is set to on, the switch circuit 402 is set to the on-state, and the D+ line 309 is pulled up to the VBUS 308 via the pull-up resistance 401. The 1-bit memory circuit 403 can maintain the output state of the electronic device 100 even when the electronic device 100 has been set to the power-off state. As a result, the on-state of the switch circuit 402 is maintained, and the pull-up state of the D+ line 309 is maintained by the pull-up resistance 401. In addition, even if the electronic device 100 is set to the power-off state, the USB charging with power supplied from the external apparatus 200 can continue since the external apparatus 200 will determine that it is still connected (by the FS mode) to the electronic device 100. Subsequently, the control unit 101 sets the electronic device 100 to the power-off state.

In step S508, the control unit 101 sets the electronic device 100 to the power-off state after causing the display unit 105 to display a message indicating that the USB charging cannot be continued due to the shutdown of the electronic device 100.

As described above, when an instruction to set the electronic device 100 to the power-off state is made while the USB charging with power supplied from the external apparatus 200 is performed, the electronic device 100 can establish a connection with the external apparatus 200 by USB 1.1 (FS mode). Then, the electronic device 100 can enable the external circuit 111 to maintain the USB 1.1 connection even after the electronic device 100 has been set to the power-off state. Subsequently, the electronic device 100 can shift (shut down) the electronic device 100 to the power-off state.

By the arrangement described above, the electronic device 100 in the first embodiment can continue the USB charging with power supplied from the external apparatus 200 even after the electronic device 100 has been set to the power-off state. Since the electronic device 100 has been. set to the power-off state, the power control unit 110 does not need to supply power to the control unit 101, thereby allowing almost all the power supplied from the external apparatus 200 to be used for charging the battery device 108. Hence, the charging time of the electronic device 100 can be shortened. As will be described In the third and fourth embodiments, note that although the communication which is to be maintained during the power-off state may be performed by USB 2.0 (HS mode), using USB 1.1 (FS mode) can simplify the circuit arrangement.

Second Embodiment

The first embodiment illustrated an arrangement in which USB charging, which started while the electronic device 100 is operating normally, is maintained even after the electronic device 100 has been set to the power-off state. The second embodiment will illustrate an exemplary process of the electronic device 100 that includes a special mode for performing USB charging with power supplied from the external apparatus 200 after the electronic device 100 has been set to the power-off state. Note that the arrangement of the electronic device 100, the arrangement of the external apparatus 200, the arrangement of the 4 lead wires 308 to 311, and the like are the same as those of the first embodiment and correspond with those shown in FIGS. 1 to 4.

Figure 6:
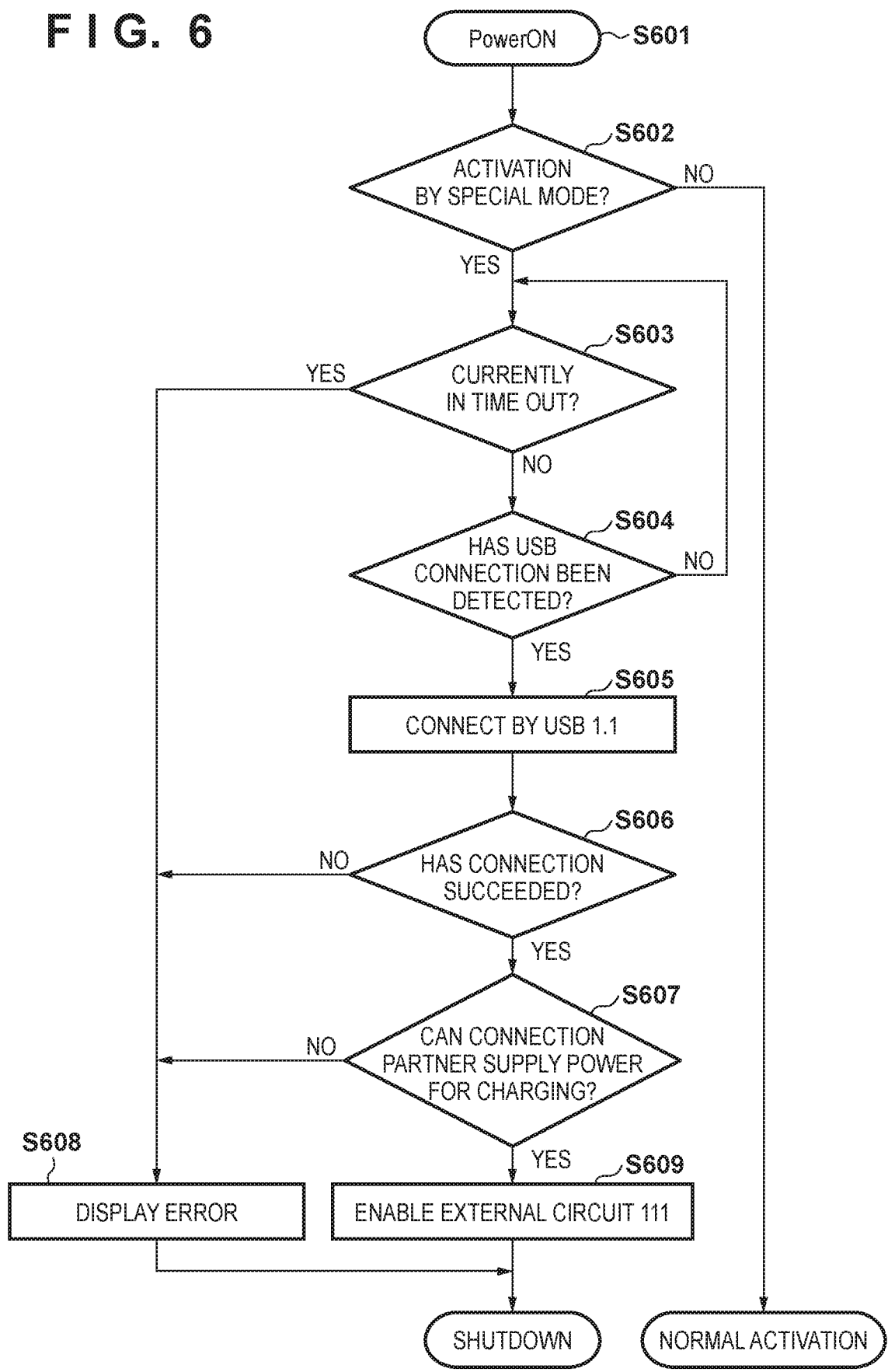
FIG. 6 is a flowchart illustrating an exemplary process of the electronic device 100 in the second embodiment.

FIG. 6 is a flowchart illustrating the exemplary process of the electronic device 100 that is performed when the electronic device 100 is connected to the external apparatus 200 by turning on the power of the electronic device 100 while the electronic device 100 is set to the special mode. Note that the exemplary process shown in the flowchart is implemented by the control unit 101 of the electronic device 100 controlling the components of the electronic device 100 in accordance with input signals and programs. Note that unless otherwise specified, the same applies to other flowcharts that show the exemplary process of the electronic device 100. The exemplary process shown in the flowchart of FIG. 6 starts when, for example, in a state in which a user of the electronic device has instructed the setting of the special mode, the user makes an instruction, via the power button, to set the electronic device 100 to the power-on state.

In step S601, the control unit 101 starts the exemplary process to set the electronic device 100 to the power-on state, and advances the exemplary process to step S602.

In step S602, the control unit 101 determines whether activation by the special mode has been instructed by the user. In step S602, if it is determined that activation by the special mode has not been instructed by the user, the control unit 101 activates the electronic device 100 by the normal mode. Otherwise, in step S602, the control unit 101 advances the exemplary process to step S603.

In step S603, the control unit 101 determines whether a USB connection detection process which is performed to detect a USB connection has timed out. Note that activation in the special mode can be instructed, for example, by the user operating the power button to turn on the power of the electronic device 100 while pressing a specific button on the instruction input unit 104. However, the instruction of the special mode is not limited to this, and any kind of operation can be made as long as it is distinguishable from a power-on by a normal power button operation.

In step S603, if it is determined that the USB connection detection process has timed out, the control unit 101 advances the exemplary process to step S608. In step S603, if it is determined that the USB connection detection process has not timed out, the control unit 101 advances the exemplary process to step S604.

In step 3604, the control unit 101 determines whether the voltage level of the VBUS 308 has changed to High by controlling the USB device controller 301. If the voltage level of the VBUS 308 has changed to High, the control unit 101 determines that USB connection has been detected, and advances the exemplary process to step S605. If the voltage level of the VBUS 308 is not High, the control unit 101 determines that no USB connection has been detected, and returns the exemplary process to step S603.

In step S605, the control unit 101 connects the electronic device 100 to the external apparatus 200 by USB 1.1. That is, the control unit 101 controls the USB device controller 301 in the connection unit 109 and enables the pull-up by the internal resistance 305 by setting the switch circuit 411 to the on-state by the USB device controller 301. The USB device controller 301 operates to maintain the USB 1.1 (FS mode) connection without establishing connection by USB 2.0 even when the external apparatus 200 is in compliance with USB 2.0. Subsequently, the control unit 101 advances the exemplary process to step S606 and determines whether the connection by USB 1.1 has succeeded.

In step S606, if it is determined that the connection to the external apparatus 200 by USB 1.1 has succeeded, the control unit 101 advances the exemplary process to step S607 and determines whether the external apparatus 200 is a device capable of supplying power. In step S606, if it is determined that the connection to the external apparatus 200 by USB 1.1 has failed, the control unit 101 advances the exemplary process to step S608.

In step S607, the control unit 101 communicates with the external apparatus 200 via the connection unit 109 to determine whether the external apparatus 200 as a USB host that is capable of supplying power. If it is determined that the external apparatus 200 is such a USB host, the control unit 101 advances the exemplary process to step S609. In step S607, if it determined that the external apparatus 200 is not such a USB host, the control unit 101 advances the exemplary process to step S608.

In step S608, the control unit 101 causes the display unit 105 to display a message indicating that the USB charging cannot be continued due to the shutdown of the electronic device 100, and sets the electronic device 100 to the power-off state.

In step S609, the control unit 101 enables the external circuit 111. As illustrated in the first embodiment, the external circuit 111 includes a circuit which is equivalent to the internal resistance 305 in the connection unit 109 and can maintain the pull-up of the D+ line 309 even after the electronic device 100 has been set to the power-off state. Even if the electronic device 100 has been set to the power-off state, the external apparatus 200 will determine that it is still connected to the electronic device 100 by the pull-up of the D+ line 309, and thus the USB charging with power supplied from the external apparatus 200 can be started and continued. Subsequently, the control unit 101 sets the electronic device 100 to the power-off state.

As described above, the electronic device 100 can establish the connection with the external apparatus 200 by USB 1.1 when the electronic device 100 is activated by the special mode. Then, the electronic device 100 can maintain, by enabling the external circuit 111, the connection by USB 1.1 even after the electronic device 100 has been set to the power-off state. Subsequently, the electronic device 100 can set the electronic device 100 to the power-off state.

By virtue of the exemplary process, it is possible to start and continue the USB charging with power supplied from the external apparatus 200 even after the electronic device 100 has been set to the power-off state. Also, in the second embodiment, there is no need for reconnection since the connection is established by USB 1.1 from the begnning, and user operability can be improved since the electronic device 100 is set to the power-off state immediately after the external circuit 111 has been enabled.

Since the electronic device 100 has been set to the power-off state, the power control unit 110 does not need to supply power to the control unit 101, thereby allowing almost all the power supplied from the external apparatus 200 to be used for charging the battery device 108. Hence, the charging time of the electronic device 100 can be shortened.

Third Embodiment

The first embodiment shows an arrangement in which the USB-connected state is maintained by switching to USB 1.1 (FS mode) when the electronic device has been set to the power-off state. However, the first embodiment is not limited to this. For example, the arrangement may maintain a connected state by USB 2.0 (HS mode). An arrangement in which the connected state by USB 2.0 (HS mode) is maintained will be illustrated hereinafter. Note that the arrangement of the electronic device 100, the arrangement of the external apparatus 200, the arrangement of the 4 lead wires 308 to 311, and the like are the same as those of the first embodiment and correspond with those shown in FIGS. 1 to 4.

Figure 7A:
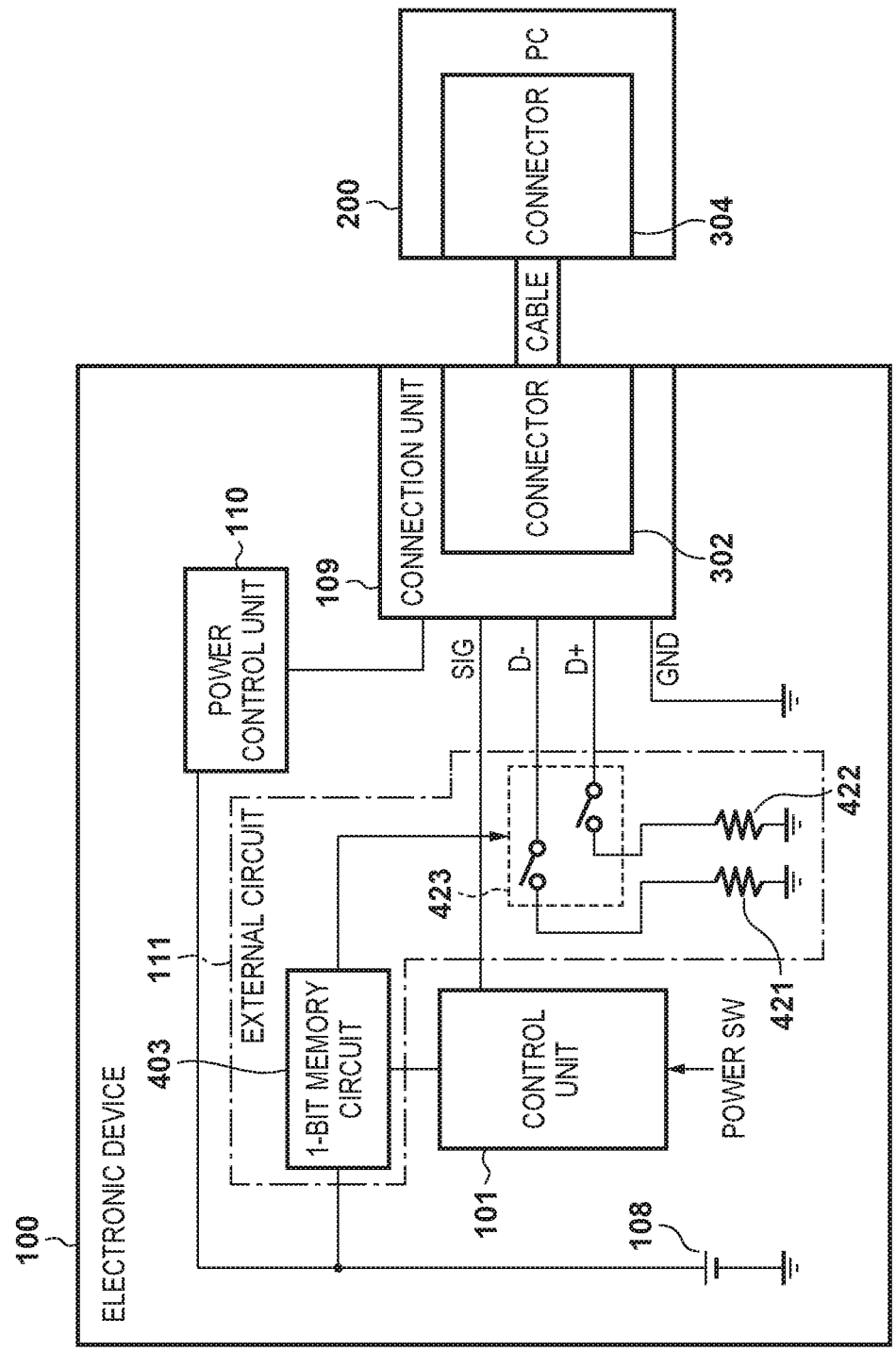
FIGS. 7A and 7B are block diagrams respectively showing examples of USB connections in the third and fourth embodiments.
Figure 7B:
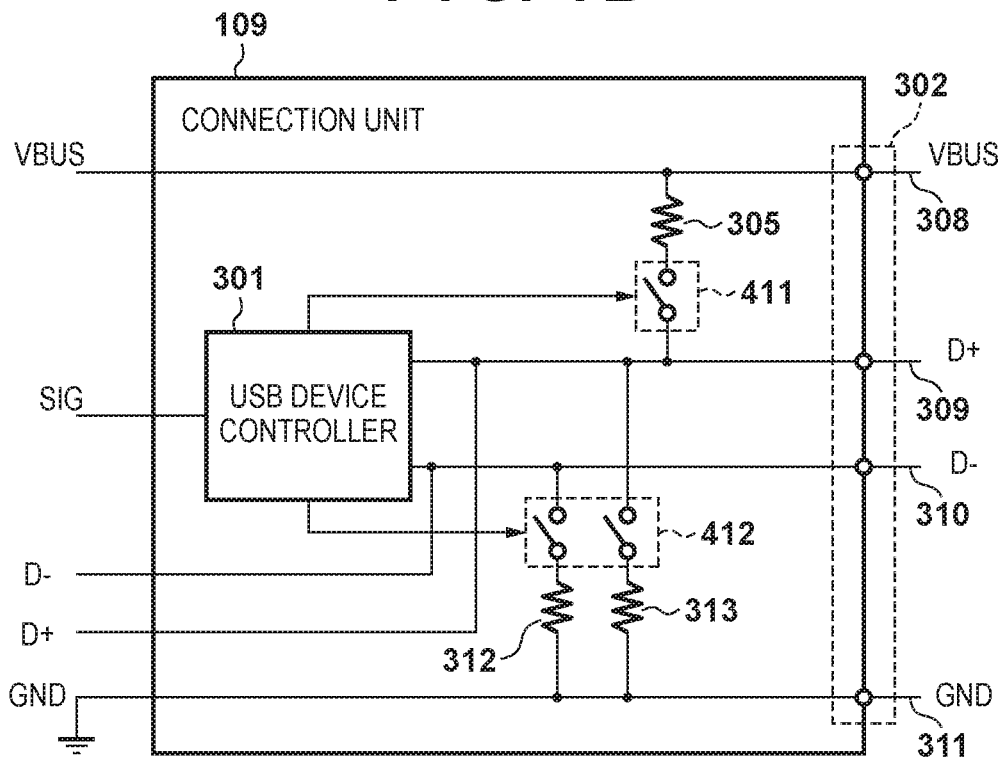

FIG. 7A is a block diagram showing details of the connection unit 109 and the external circuit 111 of the electronic device 100. FIG. 7B is a block diagram showing a more detailed arrangement of the connection unit 109 of the electronic device 100. FIG. 7B is approximately the same as FIG. 4B. The point that differs from FIG. 4B is where the D+ line 309 and the D− line 310 have been extended outside from the connection unit 109.

As shown in FIG. 7A, the external circuit 111 which operates by receiving power from the VBUS (or power from the battery device 108) includes pull-down resistances 421 and 422, a switch circuit 423, and the 1-bit memory circuit 403. The 1-bit memory circuit 403 maintains a bit state even after the electronic device 100 has been set to the power-off state. The switch circuit 423 is set to the on-state or the off-state in accordance with the bit state of the 1-bit memory circuit 403. The pull-down resistances 421 and 422 have the same resistance values as the internal resistances 312 and 313. Each of the pull-down resistances 421 and 422 is arranged so that one end is connected to the GND 311 and the other end is connected to the switch circuit 423. That is, the D+ line 309 and the D− line 310 are connected to the GND 311 via the switch circuit 423 and the pull-down resistances 421 and 422. Hence, whether the D+ line 309 and the D− line 310 are to change to the pull-down state (connected state in the HS mode of USB 2.0) is determined in accordance with the state of a switch circuit 421.

Figure 8:
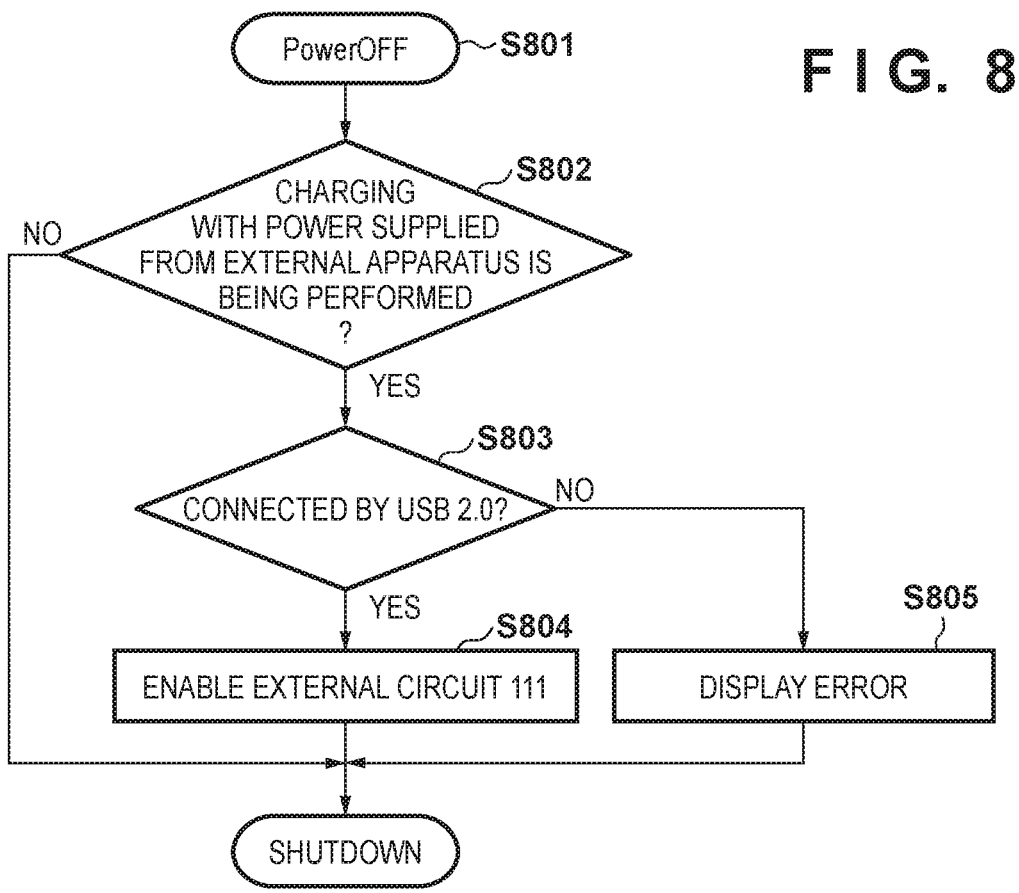
FIG. 8 is a flowchart illustrating an exemplary process of the electronic device 100 in the third embodiment.

FIG. 8 is a flowchart illustrating an exemplary process of the electronic device 100 in the third embodiment that is performed when the power of the electronic device 100 has been turned off after the electronic device 100 has been. connected to the external apparatus 200 by the USB connection. Note that the exemplary process shown in the flowchart is implemented by a control unit 101 of the electronic device 100 controlling the components of the electronic device 100 in accordance with input signals and programs. Note that unless otherwise specified, the same applies to other flowcharts showing the exemplary process of the electronic device 100. The exemplary process shown in the flowchart starts when a user of the electronic device 100 makes an instruction to set the electronic device 100 to the power-off state by operating the power button.

In step S801, the control unit 101 starts the exemplary process to set the electronic device 100 to the power-off state.

In step S802, the control unit 101 determines whether USB charging with power supplied from the external apparatus 200 is being performed. In step S802, if it is determined that the USB charging with power supplied from the external apparatus 200 is not being performed, the control unit 101 sets the electronic device 100 to the power-off state. In step S802, if it is determined that the USB charging with power supplied from the external apparatus 200 is being performed the control unit 101 advances the exemplary process to step S803.

In step S803, the control unit 101 determines whether the electronic device 100 is connected to the external apparatus 200 by USB 2.0 (HS mode). In step S803, if it is determined that the electronic device 100 is connected to the external apparatus 200 by USB 2.0, the control unit 101 advances the exemplary process to step S804. In step S803, if it is determined that the electronic device 100 is not connected to the external apparatus 200 by USB 2.0 the control unit 101 advances the exemplary process to step S805.

In step S804, the control unit 101 enables the external circuit 111. That is, the external circuit 111 includes a circuit that is equivalent to the internal resistances 312 and 313 in the connection unit 109 and is a circuit that can maintain the pull-down of the D+ line 309 and the D− line 310 even when the electronic device 100 has been set to the power-off state. For example, as shown in FIG. 7A, the control unit 101 sets the bit state of the 1-bit memory circuit 403 of the external circuit 111 to "1 (on)". When the bit state of the 1-bit memory circuit 403 is set to on, the switch circuit 423 is set to the on-state. Hence, the D+0 line 309 and the D− line 310 are pulled down to the GND 311 via the pull-down resistance 422 and the cull-down resistance 421, respectively. Since the 1-bit memory circuit 403 maintains its output state even when the electronic device 100 has been set to the power-off state, the on-state of the switch circuit 423 is maintained, and the pull-down states of the D+ line 309 and the D− line 310 by the pull-down resistances 422 and 421 are maintained. Hence, even if the electronic device 100 has been set to the power-off state, the USB charging with power supplied from the external apparatus 200 can be continued since the external apparatus 200 will determine that it is still connected (by the HS mode) to the electronic device 100. Subsequently, the control unit 101 sets the electronic device 100 to the power-off state.

In step S805, the control unit 101 causes the display unit 105 to display a message indicating that the USB charging cannot be continued due to the shutdown of the electronic device 100, and sets the electronic device 100 to the power-off state.

As described above, the electronic device 100 in the third embodiment can maintain, when the power of the electronic device 100 is turned of while performing the USB charging with power supplied from the external apparatus 200, the connection by USB 2.0 (HS mode) even after the electronic device 100 has been set, to the power-off state. As a result, it is possible to continue the USB charging with power supplied from the external apparatus 200 even after the electronic device 100 has been set to the power-off state. In recent years, USB 2.0 (HS mode) is increasingly used since USB communication has become more rapid. Hence, by providing an arrangement in which USB connection by USB 2.0 can be maintained as that of the third embodiment, even an arrangement in which switching of USB connection to the FS mode is not performed, as that of the first embodiment, can be sufficiently practical. Note that in step S803, if it is determined that the connection is not by USB 2.0, it may be arranged so that the charging by USB 1.1 will be continued by performing the processes (steps S503 to S506) of the first embodiment.

Since the electronic device 100 has been set to the power-off state, the power control unit 110 does not need to supply power to the control unit 101, thereby allowing almost all the power supplied from the external apparatus 200 to be used for charging the battery device 108. Hence, the charging time of the electronic device 100 can be shortened.

Fourth Embodiment

The third embodiment illustrated an arrangement in which USB charging, which started while the electronic device 100 is operating normally (operating by the HS mode), is maintained even after the electronic device 100 has been set to the power-off state. The fourth embodiment will illustrate an exemplary process of the electronic device 100 that. includes a special mode for performing USB charging with power supplied from the external apparatus 200 after the electronic device 100 has been set to the power-off state. Note that the arrangement of the electronic device 100, the arrangement of the external apparatus 200, and the arrangement of the 4 lead wires 308 to 311 are the same as those in the third embodiment.

Figure 9:
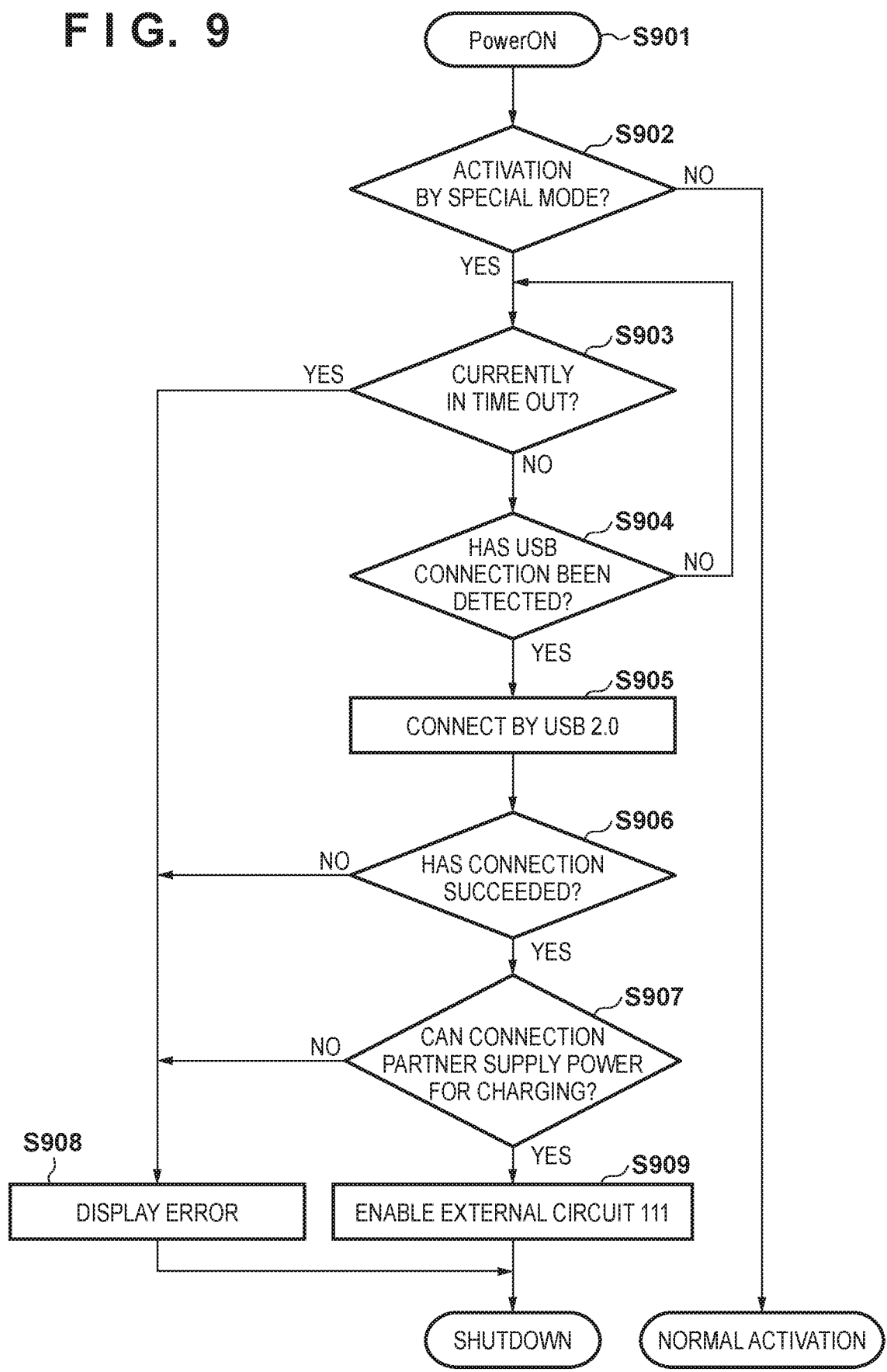
FIG. 9 is a flowchart illustrating an exemplary process of the electronic device 100 in the fourth embodiment.

FIG. 9 is a flowchart illustrating an exemplary process of the electronic device 100 that is performed when a connection has been established with the external apparatus 200 by setting the electronic device 100 in the special mode by operating the instruction input unit 104 of the electronic device 100 and turning on the power of the electronic device 100. Note that the exemplary process shown in the flowchart is implemented by the control unit 101 of the electronic device 100 controlling the components of the electronic device 100 in accordance with input signals and programs. The exemplary process shown in the flowchart is started, in the same manner as that of the second embodiment, when, in a state in which a user of the electronic device has instructed the setting of the special mode by operating the instruction input unit 104, the user makes instruction, via the power button, to set the electronic device 100 to the power-on state.

In step S901, the control unit 101 starts the exemplary process to set the electronic device 100 to the power-on state.

In step S902, the control unit 101 determines whether activation by the special mode has been instructed by the user. In step S902, if it is determined that the user has not instructed the activation by the special mode, the control unit 101 activates the electronic device 100 in the normal mode.

In step S902, if it is determined that activation by the special mode has been instructed by the user, the control unit 101 advances the exemplary process to step S903.

In step S903, the control unit 101 determines whether a USB connection detection process which is performed to detect a USB connection has timed out. Note that activation by the special mode can be instructed, in the same manner as that in the second embodiment, for example, by the user operating the power button to turn on the power of the electronic device 100 while pressing a specific button on the instruction input unit 104. However, the instruction of the special mode is not limited to this, and any kind of operation can be made as long as it is distinguishable from a power-on by a normal power button operation.

In step S903, if it is determined that the USB connection detection process has timed out, the control unit 101 advances the exemplary process to step S908. In step S903, if it is determined that the USB connection detection process has not timed out, the control unit 101 advances the exemplary process to step S904.

In step S904, the control unit 101 determines whether the connection by USB has been detected. For example, in step S904, the control unit 101 determines whether the voltage level of the VBUS 308 has changed to High. If the voltage level of the VBUS 308 has changed to High, the control unit 101 determines that the USB connection has been detected and advances the exemplary process to step S905. If the voltage level of the VBUS 308 is not High, the control unit 101 determines that no USB connection has been detected, and returns the exemplary process to step S903.

In step S905, the control unit 101 establishes a connection with the external apparatus 200 by USB 2.0 (HS mode). That is, the control unit 101 controls a USB device controller 301 in a connection unit 109 and enables the pull-down by the internal resistances 312 and 313 by setting the switch circuit 412 to the on-state by the USB device controller 301. The USB device controller 301 establishes the connection by USB 2.0 (HS mode) if the external apparatus 200 is in compliance with USB 2.0. Subsequently, the control unit 101 advances the exemplary process to step S906 and determines whether the connection by USB 2.0 (HS mode) has succeeded.

In step S906, if it is determined that the connection to the external apparatus 200 by USB 2.0 (HS mode) has succeeded, the control unit 101 advances the exemplary process to step S907 and determines whether the external apparatus 200 is an external apparatus capable of supplying power for charging. In step S906, if it is determined that the connection to the external apparatus 200 by USB 2.0 has failed, the control unit 101 advances the exemplary process to step S908.

In step S907, the control unit 101 communicates with the external apparatus 200 via the connection unit 109 and determines whether the external apparatus 200 is a USB host capable of supplying power for charging. If it is determined that the external apparatus 200 is such a USB host, the control unit 101 advances the exemplary process to step S909. In step S907, if it is determined that the external apparatus 200 is not such a USB host, the control unit 101 advances the exemplary process to step S908.

In step S908, the control unit 101 causes the display unit 105 to display a message indicating that the USB charging cannot be continued due to the shutdown of the electronic device 100, and sets the electronic device 100 to the power-off state.

In step S909, the control unit 101 enables the external circuit 111. As described in the third embodiment, the external circuit 111 includes a circuit that is equivalent to the internal resistances 312 and 313 in the connection unit 109 and can maintain the pull-down of the D+ line 309 and the D− line 310 even after the electronic device 100 has been set to the power-off state. Even if the electronic device 100 has been set to the power-off state, the external apparatus 200 will determine that it is still connected to the electronic device 100 due to the pull-down of the D− line 310 and the D+ line 309, and thus the USB charging with power supplied from the external apparatus 200 can be started and continued. Subsequently, the control unit 101 sets the electronic device 100 to the power-off state.

As described above, the electronic device 100 can establish the connection by USB 2.0 (HS mode) with the external apparatus 200 when the electronic device 100 is activated by the special mode. The electronic device 100 can then enable the external circuit 111 and maintain the USB 2.0 connection even after the electronic device 100 has been set to the power-off state. Subsequently, the electronic device 100 can change to the power-off state.

By virtue of the exemplary process, it is possible to start and continue the USB charging with power supplied from the external apparatus 200 even after the electronic device 100 has been set to the power-off state. Furthermore, user operability can be improved since the electronic device 100 is set to the power-off state immediately after the external circuit 111 has been enabled.

Since the electronic device 100 has been set to the power-off state, the power control unit 110 does not need to supply power to the control unit 101, thereby allowing almost all the power supplied from the external apparatus 200 to be used for charging the battery device 108. Hence, the charging time of the electronic device 100 can be shortened.

Note that the external circuit 111 may include both the arrangement to maintain the USB 1.1 connection in the first embodiment and the arrangement to maintain the USB 2.0 connection in the third embodiment. In such a case, the electronic device 100 can maintain, when the electronic device 100 is set to the power-off state, the connection-state by setting the switch circuit 402 (FIG. 4A) to the on-state if the executed USB connection is by USB 1.1 or setting the switch circuit 423 (FIG. 7A) to the on-state if the executed USB connection is by USB 2.0. According to such an arrangement, even after the power of the electronic device 100 has been turned off, the charging state of the electronic device 100 can be maintained without having to switch the USB connection regardless of whether the USB connection is by USB 1.1 or USB 2.0.

Figure 10A:
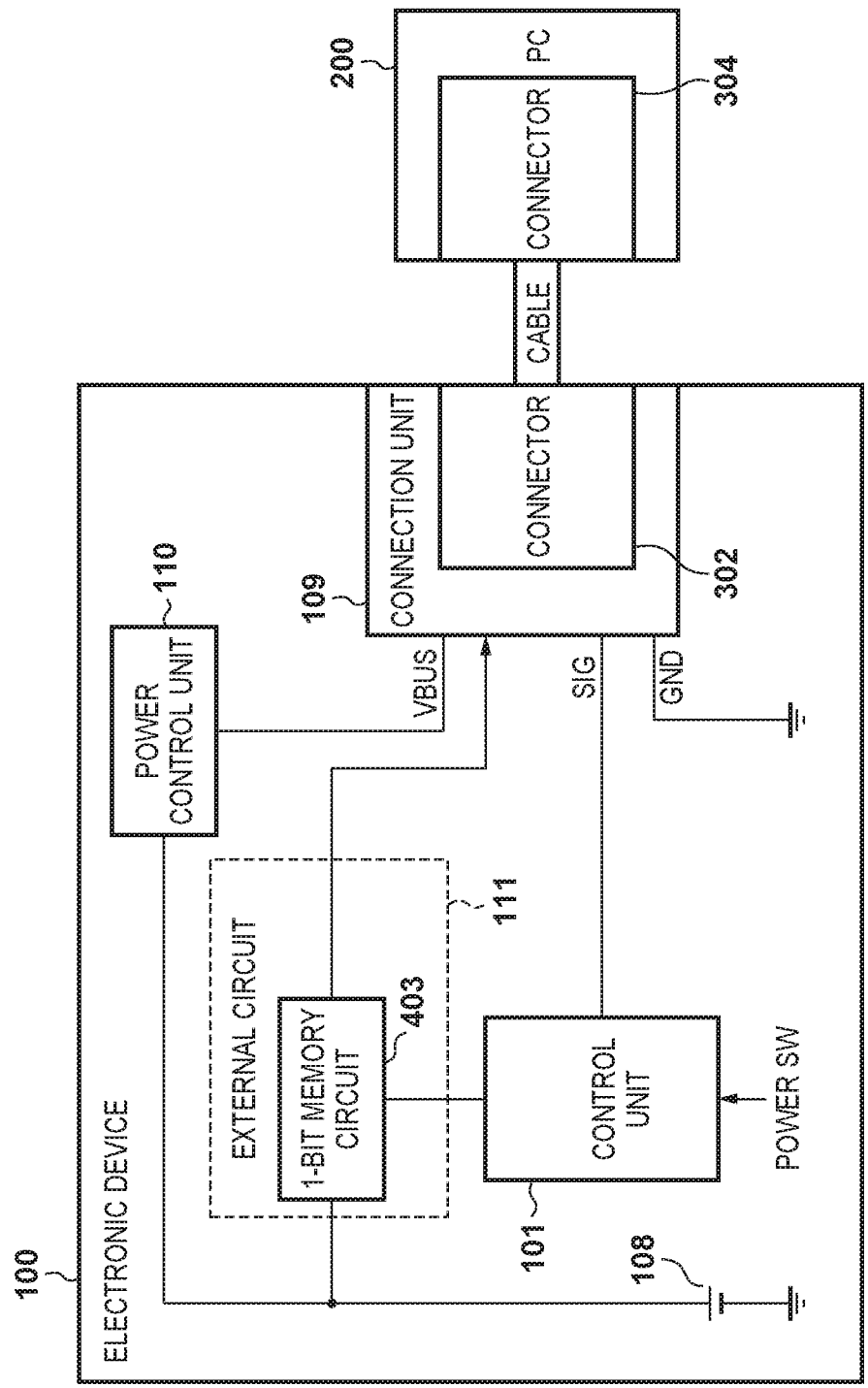
FIGS. 10A and 10B are block diagrams respectively illustrating examples of other arrangements for maintaining a USB connected state.
Figure 10B:
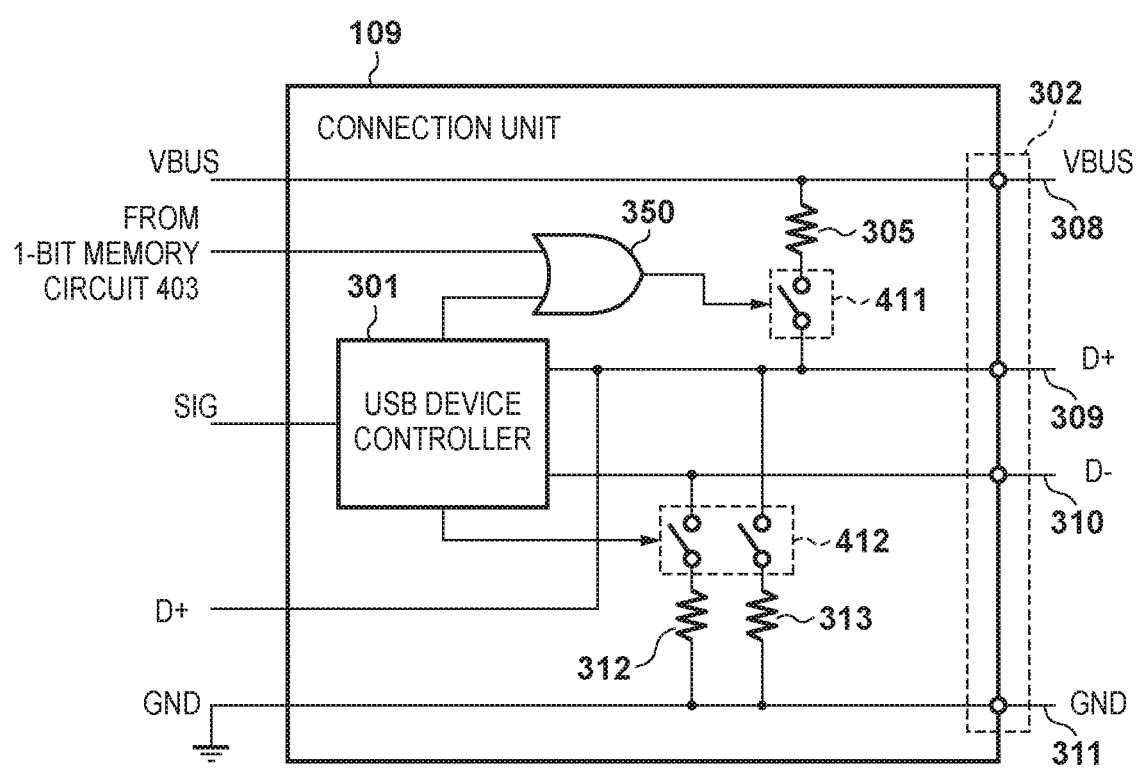

In addition, although the external circuit 111 used the switch circuit 402 to maintain the pull-up state of the D+ line 309 in the first embodiment, it is not limited to this. For example, as shown in FIGS. 10A and 10B, the switch circuit 411 in the connection unit 109 may be controlled by the output from an OR circuit 350 via the USB device controller 301 and the 1-bit memory circuit 403. When the output of the 1-bit memory circuit 403 is set to the on-state while the USB 1.1 connection is established, the on-state of the OR output of the OR circuit 350 is maintained even when the electronic device 100 is set to the power-off state. Hence, the pull-up state of the D+ line 309 is maintained even after the electronic device 100 has been set to the power-off state, and the USB connection and the USB charging are continued. The above-described arrangement can be applied to the second embodiment as a matter of course. Furthermore, the above-described arrangement can be applied to the third and fourth embodiments by providing the OR circuit 350 with respect to the switch circuit 412.

As described above, according to the fourth embodiment, in the USB device that is connected to the USB host and performs the USB charging, the USB charging can continue even when the electronic device 100 has been set to the power-off state. In addition, since the USB charging can be performed when the electronic device 100 is set to the power-off state, the charging time can be shortened.

Note that the first to fourth embodiments have illustrated examples, respectively, in which a USB is used as the external cable. However, the first to fourth embodiments are not limited to this. It is sufficient for the external cable to include a power supply line (VBUS line in a USB) to supply power usable for charging and a specific line (D+ or D− line in a USB) for the external apparatus 200 to monitor a voltage to determine the connection between the external apparatus 200 and the electronic device 100.

Fifth Embodiment

The various functions, processes, and methods illustrated in the first to fourth embodiments can be implemented by a personal computer, a microcomputer, or a CPU (Central Processing Unit) by using a program. In the fifth embodiment, the personal computer, the microcomputer, or the CPU will be referred to as a "computer X" hereinafter. Additionally, in the fifth embodiment, a program that controls the computer X and implements the various functions, processes, and methods illustrated in the first to fourth embodiments will be referred to as a "program Y".

The various functions, processes, and methods illustrated in the first to fourth embodiments are implemented by the computer X executing the program Y. In this case, the program Y is supplied to the computer X via a computer-readable storage medium. The computer-readable storage medium in the fifth embodiment includes at least one of a hard disk device, a magnetic storage device, an optical storage device, a magneto-optical storage device, a memory card, a volatile memory, and a non-volatile memory. The computer-readable storage medium in the fifth embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2016-194770, filed Sep. 30, 2016, which is hereby incorporated by reference herein in its entirety.

What is claimed is:

1. An electronic device comprising:
   power control circuitry that charges a battery device with power supplied from a power supply line of a cable;
   voltage maintaining circuitry that maintains a predetermined voltage of a specific line of the cable by creating a connection between the power supply line and the specific line, in a case where an external apparatus is communicably connected to and exchanges data with the electronic device via the cable in a first communication mode; and
   a processor that controls the voltage maintaining circuitry so that the predetermined voltage of the specific line is maintained by the voltage maintaining circuitry, in a case where the power control circuitry is charging the battery device with power supplied from the power supply line in the first communication mode when the electronic device is changed from a power-on state to a power-off state,
   wherein the processor, in a case where the external apparatus is communicably connected to the electronic device via the cable in a second communication mode different from the first communication mode, exchanges data with the external device and charges the battery device when the electronic device is in the power-on state, and displays, prior to switching the electronic device from the power-on state to the power-off state, the charging of the battery device with power supplied from the power supply line cannot by continued.

2. The electronic device according to claim 1, wherein the specific line is a line used by the external apparatus to monitor a voltage which determines that the electronic device is connected via the external cable.

3. The electronic device according to claim 1, wherein the specific line is a signal line in the cable.

4. The electronic device according to claim 1, wherein the specific line is connected to the predetermined voltage when the cable is communicably connected in a specific communication mode.

5. The electronic device according to claim 1, wherein:
the processor determines whether the external apparatus connected to the cable can supply power for charging the battery device, and
the processor controls the voltage maintaining circuitry so that the predetermined voltage of a specific line is maintained by the voltage maintaining circuitry, in a case in which the processor has determined that the external apparatus can supply power for charging the battery device.

6. The electronic device according to claim 1, wherein the processor controls the voltage maintaining circuitry so that the predetermined voltage of a specific line is maintained by the voltage maintaining circuitry, in a case in which the battery device is being charged by the power control circuitry.

7. The electronic device according to claim 1, wherein the processor is configured to, when the electronic device is in the power-on state, charging, and communicably connected to the external device in either the first communication mode or the second communication mode:
responsive to the electronic device receiving a user instruction instructing the electronic device to be in the power-off state, switch the electronic device from the power-on state to the power-off state.

8. The electronic device according to claim 1, wherein the processor starts, when the external apparatus is communicably connected to the electronic device via the cable in the second communication mode, a process of setting the electronic device to the power-off state after reconnecting to the external apparatus so as to be communicably connected to the external apparatus via the cable in the first communication mode.

9. The electronic device according to claim 1, wherein the first communication mode is an FS (Full Speed) mode of USB (Universal Serial Bus), and
the voltage maintaining circuitry maintains a state in which a D+ line of the USB has been pulled up to the predetermined voltage.

10. The electronic device according to claim 1, wherein the first communication mode is an HS (High Speed) mode of USB (Universal Serial Bus), and
the voltage maintaining circuitry maintains a state in which a D+ line and a D− line of the USB have been pulled down to a ground level.

11. The electronic device according to claim 1, further comprising a connection unit having a USB interface configured to receive, via the cable, in both the first and second communication modes, when the electronic device is in a power-on state, power transmitted from the external apparatus through the power supply line of the cable, and data transmitted from the external apparatus through the cable.

* * * * *